3,692,668
PROCESS FOR RECOVERY OF OIL FROM REFINERY SLUDGES

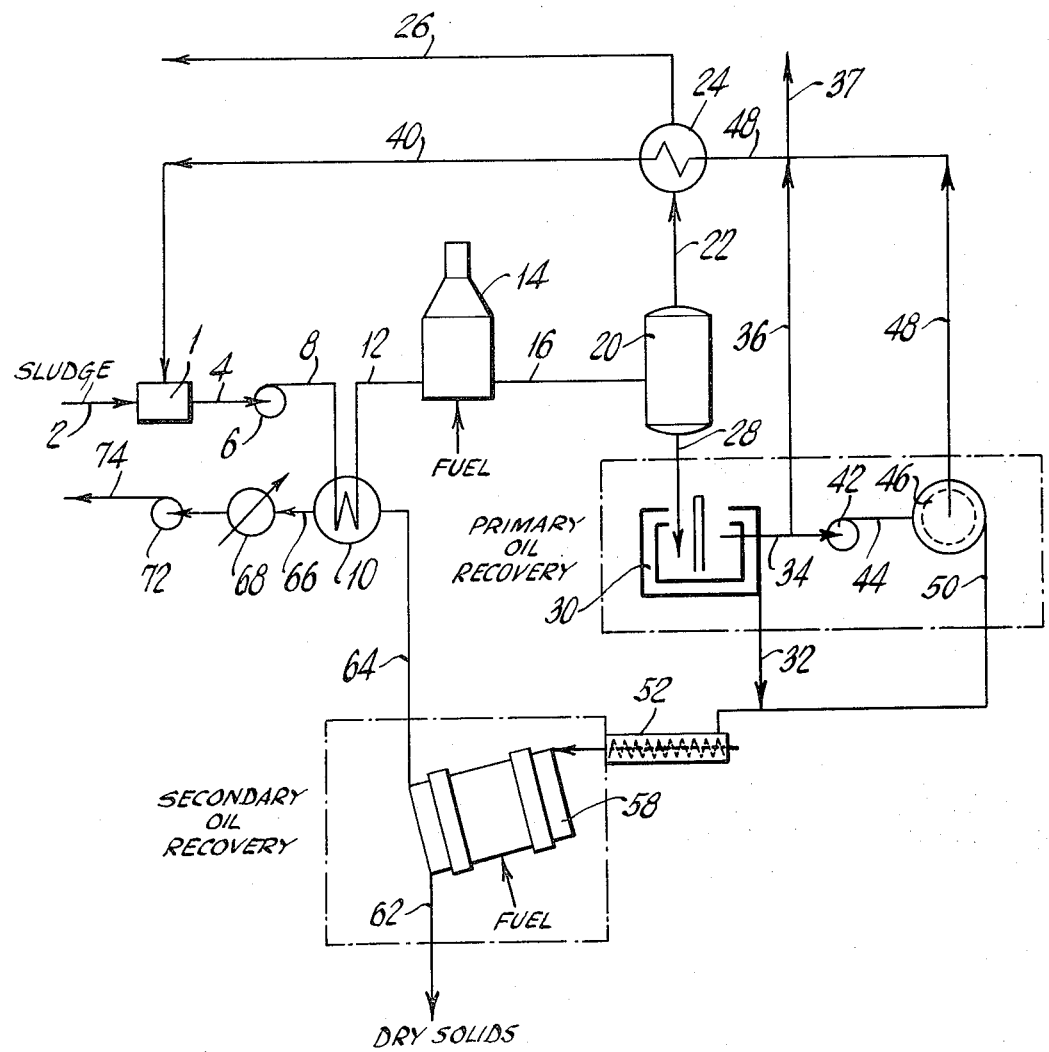

Drew E. McCoy, Richmond, William N. Gilmer, Chesterfield, and Edward C. Johnson, Richmond, Va., assignors to Texaco Inc., New York, N.Y.
Filed Mar. 3, 1971, Ser. No. 120,521
Int. Cl. B01d 12/00
U.S. Cl. 210—18                                    8 Claims

ABSTRACT OF THE DISCLOSURE

In the first stage of a continuous process refinery sludges are mixed and diluted with oil, such as recycle oil derived from the process, to improve the handling characteristics of the sludge, heated to a temperature of about 220° to 300° F. at a pressure of from about 15 to about 25 p.s.i.a. to separate the sludge into a water vapor phase and an oil-sludge slurry phase. The water vapor is condensed to yield water with a reduced Chemical Oxygen Demand which, in most instances, can be discharged in receiving bodies of water without polluting the same, or can, if required, be further treated before discharge from the process, while most of the oil from oil-sludge slurry phase is separated therefrom by, for example, centrifugation. In the second phase of the process, the concentrated sludge from the centrifugation step is heated at a temperature of about 400° to 800° F. and a pressure of about 1 to about 20 p.s.i.a. to remove by vaporization the remaining oil which is collected and condensed thus yielding dry, oil-free, free-flowing solids useful for a wide variety of applications, such as for land fill.

BACKGROUND OF THE INVENTION
Field of the invention

This invention relates to a continuous two-stage process for deoiling and dewatering refinery sludges in which, in the first stage, sludges mixed with a diluent oil, such as recycle oil recovered in the process, are heated at an elevated temperature and at a pressure which is about atmospheric or slightly above to effect separation of the sludges into a water vapor phase, and an oil-solids slurry phase. Separation of most of the oil from the oil-solids slurry phase is accomplished preferably by mechanical means, such as by centrifugation, after which the concentrated sludge is heated at an elevated temperature and at substantially atmospheric pressure or below to effect removal of the remaining oil by vaporization thus yielding dry, oil-free, free-flowing solids.

Description of the prior art

Petroleum based refinery sludges are widely encountered waste by-products of the petroleum refining industry. Such sludges are typically stable emulsions of oil, water and solid particulates. The solids originate as sands and clays contained in crude oil, stray catalyst particles, coke fines and as precipitates, scale and rust derived from various refinery processes.

Since petroleum sludges are produced continuously in refineries, they pose a constant disposal problem. For example, large amounts of sludges accumulate on the bottoms of settling ponds used to remove suspended matter from refinery water effluent streams. Eventually the pond bottoms must be dredged in order to maintain effluent quality and large volumes of sludges are generated for disposal. API separator bottoms and oil-soaked sand and soil resulting from oil spills also contribute to the sludge disposal problem of refineries. The nature of the sludge compositions has made it difficult over the years to economically deoil and dewater the sludges for pollution-free disposal.

Incineration offers one means of disposing of these sludges. However, the complex nature of such materials makes it necessary to provide substantial air pollution control facilities to prevent atmospheric pollution during burning operation. Also, only a fraction of the value of the oil content in the sludges can be recovered in the form of heat and some method of disposal is still required for the non-combustible solids which form an appreciable part of the sludges.

Various processes have been advanced for deoiling refinery sludges to recover the oil contained therein for reuse. However, such processes have not been adopted to any great extent by the industry. For example, the use of both benzene and naphtha with added water in attempts to deoil sludges has been found economically unattractive because the pond settling characteristics of the resulting mass is generally unsatisfactory. Likewise, attempts to deoil and break sludges with iso-octane and gas oil have not been generally successful because the oil phase and the water-solids phase do not separate.

A typical petroleum sludge contains about 35% solids, about 38% water, with the balance being oil. The high content of the oil and its value as a cracking stock make it desirable to recover as much of the oil present in the sludges as possible for removal and recycling to the refinery cracking unit. There is a need in the art, therefore, for an economic process to recover this oil while at the same time producing a readily disposable solid and desirably one in which the water content of the sludges issuing from the process has a reduced Chemical Oxygen Demand.

One of the principal objects of this invention is to provide a process for recovering dry, oil-free, free-flowing solids from refinery sludges.

Another object of this invention is to provide a continuous process by which refinery sludges can be deoiled and dewatered under substantially atmospheric pressure conditions.

A further object of this invention is to provide a process for dewatering sludges in which the water recovered therefrom has a reduced Chemical Oxygen Demand.

SUMMARY OF THE INVENTION

In the process of this invention the refinery sludges which are highly viscous and abrasive due to heavy oils and solid particles present and are not readily pumped through restricted areas such as heat exchanger tubes are mixed and diluted with oil such as recycle oil derived from the process or any hydrocarbon oil fraction derived, for example, from refinery operations and preferably having a boiling point of not less than about 300° F. to provide a sludge mixture of improved pumpability and heat transfer. Generally from about 0.25 to about 5.0 volumes or more and, preferably, about 0.5 to about 2.0 volumes of the hydrocarbon oil are mixed with each volume of the sludge. It has been found that when the sludge mixture is passed through a first heating zone maintained at a temperature of about 220° to 300° F. and at a pressure of about 15 to about 75 p.s.i.a. and, preferably, at a temperature of about 220° to 270° F. at a pressure of about 15 to about 40 p.s.i.a., it is possible to obtain an excellent separation of the mixture into a water vapor phase and an oil-sludge slurry phase. From the heating zone the heated mixture is passed to a suitable separator vessel which serves to separate the water vapor phase (i.e., steam) from the remaining oil-solids slurry phase. Steam withdrawn from the separator is condensed to yield water of reduced Chemical Oxygen Demand while the oil-solids slurry phase is sent to the primary oil recovery section of the process.

In the primary oil recovery section a substantial part of the oil, i.e., about 50 to about 90 weight percent of the oil is separated from the oil-solids slurry phase by, for example, mechanical means such as through the use of a centrifuge optionally in conjunction with a filter. Advantageously, a portion of the recovered oil is recycled for mixing with the untreated sludges while the remainder is routed to the refinery for processing. The concentrated sludge from the primary oil recovery section still contains appreciable amounts of absorbed oil and is, therefore, routed to the secondary oil recovery section of the process.

In the secondary oil recovery section the concentrated sludge is passed through a second heating zone maintained at a temperature of about 400° to about 800° F. at a pressure of about 1 to about 20 p.s.i.a. and, preferably, at a temperature of about 550° to 750° F. and at a pressure of about 5 to about 15 p.s.i.a., such as a rotary kiln where the remainder of the oil contained in the solids is vaporized. The oil vapors which are removed from the kiln by means of a vacuum system, by eluting with a flow of hot inert gas or by any other convenient method are subsequently condensed, for example, by exchanging heat in the feed-effluent heat exchanger.

Although it is possible to employ a part of the oil recovered from this process as fuel to heat the fired heater and kiln, it is preferred to utilize the recovered oil as catalytic cracking feedstock. The dry solids produced in the second heating zone are useful for a variety of purposes and, for example, are readily disposable in a sanitary landfill.

In the following examples, and through the specification, the term "Chemical Oxygen Demand," abbreviated "COD," is used in the usual sense. Thus COD denotes the total oxidizable material present in the liquid under consideration regardless of whether or not it is biodegradable. BOD tests, on the other hand, denote the amount of oxygen consumed during a five-day period of bacterial activity at 20° C. on a chemically standardized and stabilized sample. Although COD is not strictly comparable to the biological oxygen demand (BOD), it is believed sufficiently useful as an indication of reduction of BOD to provide a basis for comparison of the effectiveness of alternate methods of treatment, particularly when applied to comparable waste samples.

Further details of this process become more readily apparent from the following description taken together with the accompanying drawing, the single figure of which is a schematic view illustrating in non-limiting fashion a practical embodiment of the two-stage process of this invention.

DESCRIPTION OF THE PREFERRED EMBODIMENT

As shown in Figure F, refinery sludge such as Refinery Sludge A (see analysis below), is passed into mixing area 1 via line 2 while recycle oil enters mixing area 1 via line 40 and the resulting pumpable mixture is routed via line 4 to pump 6 from which the sludge mixture is pumped via line 8 through feed-effluent heat exchanger 10 where it is heated by heat exchange with hot oil vapors leaving rotary kiln 58. Leaving heat exchanger 10 the heated sludge mixture stream is passed by means of line 12 through a heating zone 14, which can be, for example, a gas or oil-fired heater or any other suitable heating apparatus, maintained at a temperature of about 220° to about 300° F. and at a pressure of about 15 to about 75 p.s.i.a. The heated sludge mixture is withdrawn from heating zone 14 and passed by means of line 16 to separator 20 where the heated sludge mixture separates into a water vapor phase and an oil-solids slurry phase. The water vapor phase, i.e., steam, is withdrawn overhead and routed via line 22 through heat exchanger 24 where it is cooled and condensed in heat exchange with recycle oil. The condensed water which has a considerably reduced Chemical Oxygen Demand (COD) is passed to heat exchanger 24 by means of line 26 for possible further reduction of COD in a suitable biological treating operation, such as an activated sludge tank. The oil-solids slurry phase is removed from separator 20 via line 28 and sent to a suitable mechanical separation unit such as a centrifuge or a filter. Separated oil is withdrawn from centrifuge 30 via line 34 and routed via line 36 to line 48. A portion of the oil withdrawn through line 36 is sent to a suitable storage area via line 37. Optionally, the oil withdrawn in line 34 may be passed to pump 42 and then pumped into filter 46 via line 44, for recovery of any solids remaining in the oil, if required. Oil recovered in the optional filtration operation is routed from filter 46 via line 48 to heat exchanger 24. Oil-wet solids recovered in centrifuge 30 are transferred via a gravity hopper feed line 32 to a conveyor, such as screw feeder 52 and then routed via line 56 to a second heating zone, such as a rotating kiln 58, which is heated by any suitable method such as by an oil-fired burner and maitained at a temperature of about 400° to about 800° F. under a pressure of about 1 to about 20 p.s.i.a. From optional filter 46 oily solids are transferred via a gravity hopper feed line 50 to a conveyor such as a screw feeder 52 and then sent via line 56 to kiln 58. Oil vapor is withdrawn from kiln 58 via line 64 and passed through heat exchanger 10 where it is cooled and condensed by heat exchange with the entering sludge mixture. Leaving heat exchanger 10 the condensed oil is passed by means of line 66 through cooler 68 and then via line 70 to pump 72 from which the recovered oil is pumped via line 74 to an appropriate storage area. Dry, oil-free, free-flowing solids withdrawn from kiln 58 at 62 are conveyed to an appropriate storage area or placed directly on the land.

Analyses of three Refinery Sludges A, B and C, typical of those which may be deoiled and dewatered by the process of this invention, are set forth below:

Refinery Sludge A

A sample of bottom sludge was obtained from #11 Reservoir at Texaco Inc., Port Arthur, Tex. The sample as received contained 5–10% of free-floating oil-water emulsion. The remainder was a gritty, oily, very viscous liquid. The following analysis of the sludge was obtained.

SAMPLE NO. LC–9 PAP

| | |
|---|---|
| Water, wt. percent | 25 |
| Oil, wt. percent | 33 |
| Residue, wt. percent | 34 |
| Loss during analysis, wt. percent | 8 |
| Wt. percent organic and volatile of residue | 27 |
| Wt. percent inorganic of residue | 73 |

Refinery Sludge B

A sample of sludge was obtained from the Disposal Pit at Texaco Inc., Port Arthur, Tex. The sludge was black, oily, and gritty. The sample had the following analysis:

SAMPLE NO. LC–16 PAP

| | |
|---|---|
| Water, wt. percent | 48 |
| Oil, wt. percent | 24 |
| Residue, wt. percent | 22 |
| Loss during analysis, wt. percent | 6 |
| Wt. percent organic and volatile of residue | 24 |
| Wt. percent inorganic of residue | 76 |

Refinery Sludge C

A sample of BS&W (Bottom Sediment and Water, from tank bottoms, etc.) sludge was obtained from Texaco Inc., Port Arthur, Tex. The sludge was black, oily, and gritty and had the following analysis:

SAMPLE NO. LC-34 PAP

| | |
|---|---|
| Water, wt. percent | 43 |
| Oil, wt. percent | 17 |
| Residue, wt. percent | 27 |
| Loss during analysis, wt. percent | 13 |
| Wt. percent organic and volatile of residue | 27 |
| Wt. percent inorganic of residue | 73 |

What is claimed is:

1. A continuous process for deoiling and dewatering oily sludges which comprises: (A) in a first stage:
   (a) mixing about 0.25 to about 5.0 volumes of oil with each volume of oily sludge fed to the process whereby a pumpable mixture is formed,
   (b) heating the resulting mixture at a temperature of about 220° to about 300° F. and at a pressure of about 15 to about 75 p.s.i.a.,
   (c) separating the heated mixture into an oil-solids slurry phase and a water vapor phase,
   (d) separating a substantial part of the oil from the said oil-solids slurry phase and recovering the said oil and (B) in a second stage:
   (e) heating the solids derived in step (d) to a temperature of about 400° to about 800° F. and at a pressure of about 1 to about 20 p.s.i.a. to vaporize any oil remaining associated therewith whereby dry, free-flowing, oil-free solids are obtained, and finally
   (f) recovering and condensing the vaporized oil.

2. The process of claim 1 wherein the water vapor phase separated in step (c) is condensed to yield water of a reduced Chemical Oxygen Demand.

3. The continuous process of claim 2 wherein the water is treated biologically to further reduce its Chemical Oxygen Demand.

4. The process of claim 1 wherein in step (a) from about 0.50 to about 2.0 volumes of the hydrocarbon oil are mixed with each volume of the oily sludges.

5. The continuous process of claim 1 wherein at least a portion of the oil recovered in steps (d) and (f) is recycled to step (a).

6. The continuous process of claim 1 wherein in step (b) the temperature employed is about 220° to about 270° F. and the pressure is about 15 to about 40 p.s.i.a. and in step (e) the temperature employed is about 550° to about 750° F. and the pressure is about 5 to about 15 p.s.i.a.

7. The continuous process of claim 1 wherein in step (d) the oil is separated from the oil-solids slurry phase by centrifugation.

8. The continuous process of claim 1 wherein in step (e) the heating of the solids derived in step (d) is conducted in a rotary kiln operated at a pressure less than atmospheric.

References Cited

UNITED STATES PATENTS 3,323,575   6/1967   Greenfield   203—100 X

MICHAEL ROGERS, Primary Examiner

U.S. Cl. X.R.

208—13; 210—22, 56, 66